Oct. 30, 1945.   J. E. BENNETT   2,387,975
FRUIT AND VEGETABLE JUICER
Filed Nov. 12, 1943   2 Sheets-Sheet 1

INVENTOR
JOHN E. BENNETT
BY
ATTORNEY.

Oct. 30, 1945.　　　J. E. BENNETT　　　2,387,975
FRUIT AND VEGETABLE JUICER
Filed Nov. 12, 1943　　　2 Sheets-Sheet 2

INVENTOR.
John E. Bennett
BY
ATTORNEY.

Patented Oct. 30, 1945

2,387,975

UNITED STATES PATENT OFFICE 2,387,975

FRUIT AND VEGETABLE JUICER

John E. Bennett, San Francisco, Calif.

Application November 12, 1943, Serial No. 509,972

5 Claims. (Cl. 146—3)

This invention relates to improvements in fruit and vegetable juicers. Devices for comminuting fruits and vegetables to effect a release of the liquid content thereof have been known and utilized heretofore. These devices generally include a basket revolved at high speed in a vertical plane by an electric motor. The fruit or vegetable is fed into the device through an opening to engage means cooperating with the basket to force the fruit or vegetable in against a cutting disc carried by the basket so that the fruit or vegetable is reduced to finely divided form and the juice released. After a few articles have been reduced and the juice released, it is necessary to discontinue further operation and take the juicer apart to remove the solids. When a goodly quantity of juice is desired, this becomes a tedious and time-wasting operation.

It is in general the broad object of the present invention to provide a fruit and vegetable juicer in which the cooperating parts are so arranged that, along with comminution of the article, the juice and solid portions are separated, separately collected and removed from the device.

Previously known juicers have been comparatively expensive because of the mechanical construction employed. It is another object of this invention to provide a simple, inexpensive juicer construction.

The invention includes other objects and features of advantage, some of which, together with the foregoing, will appear hereinafter wherein the present preferred form of juicer of this invention is disclosed.

In the drawings accompanying and forming a part hereof, Figure 1 is a plan view of a feeder element, the view being taken so that the bottom of the element is uppermost.

Figure 1:
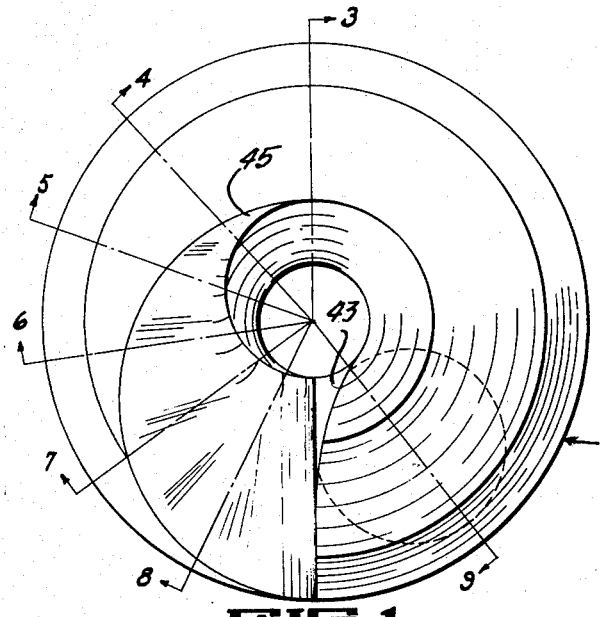
Figure 3:
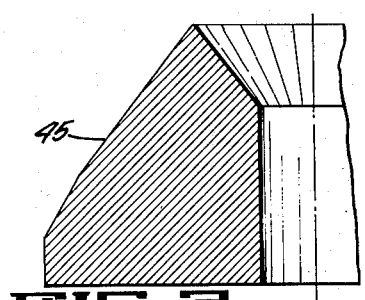
Figures 3 through 9 are respectively sections taken from the center of the feeder element along the section lines 3—9 in Figure 1 showing the development of the feeder element.
Figure 4:
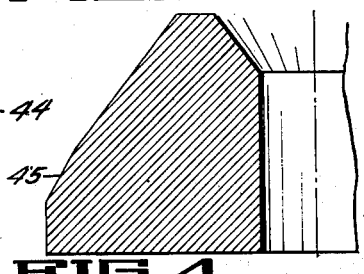
Figure 2:
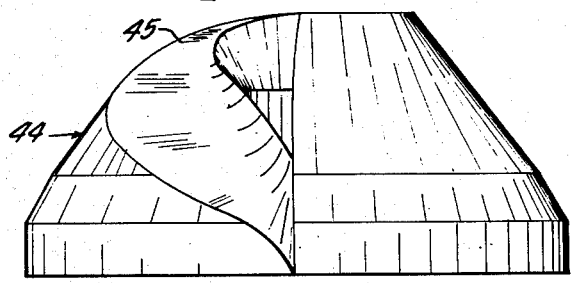
Figure 2 is a side elevation of the feeder element with the bottom uppermost.
Figure 5:
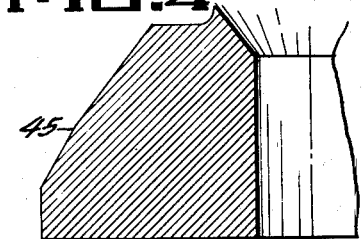
Figure 8:
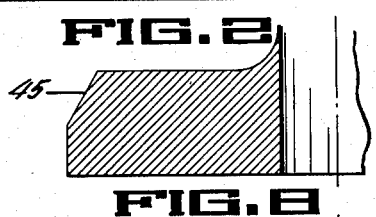
Figure 6:
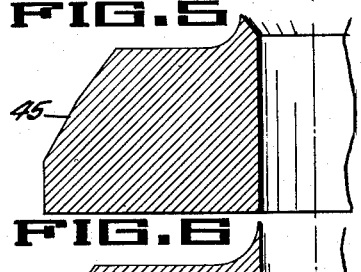
Figure 9:
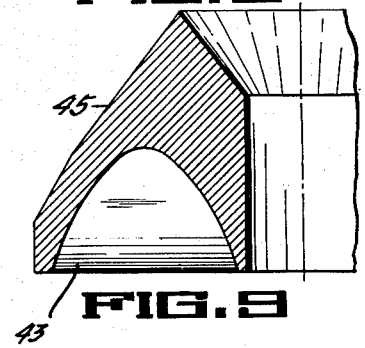
Figure 7:
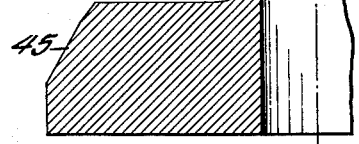

Referring to the drawings, a combined base and housing structure 6 is provided in which is mounted a highspeed electric motor 7 positioned with its shaft 8 extending vertically into a cylindrical casing 9. Casing 9 is positioned upon the base 6 and is secured to it as by rivets 11. The lower portion of the casing 9 acts as juice collecting means, a spout 10 being positioned on side wall 14 of the casing for the ready removal of the juice. Casing 6 is formed with an indentation, as at 12, to permit a glass or other container to be positioned beneath the spout 10 to receive the collected juice. An annular ring 13 is secured to the side wall 14 of casing 9 and cooperates with it to provide a trough which serves as a solid collecting means, collected solids being removed through a spout 16.

The motor shaft 8 carries a tapered support 21 for a basket generally indicated at 22. This basket, as appears in the drawings, is formed generally in the shape of a W. A bearing portion 23, provided at the central portion of the W, fits onto the tapered support 21. A thumbscrew 24 and a washer 25 are provided to secure the basket in position. From the bearing portion 23, the basket extends downwardly and outwardly, the floor of the basket being in the form of a V in cross-section. Thus, the basket includes a radial portion 26 immediately adjacent the bearing portion 23 which extends outwardly and downwardly to a junction with another radial portion 27 which extends outwardly but upwardly, terminating in a perforated wall section 28 having apertures 30 therein. Generally, the floor of the basket is made imperforate. Positioned snugly upon the basket is a cutter or cutting element indicated generally at 31 and having a plurality of knives 32 formed thereon and extending in the direction of rotation of the basket. The cutter follows the configuration of the basket, but its perforated side wall 33 extends upwardly beyond the side wall 28 of the basket to a rim or lip 34 which extends beyond wall 14 of the casing. Solids are forced up the side wall by centrifugal force and are discharged over into the annular trough provided by member 13, while the liquid portion passes through apertures 40. Spaced fingers 36 move solids collecting in the trough around to the discharge spout 16.

Figure 10:
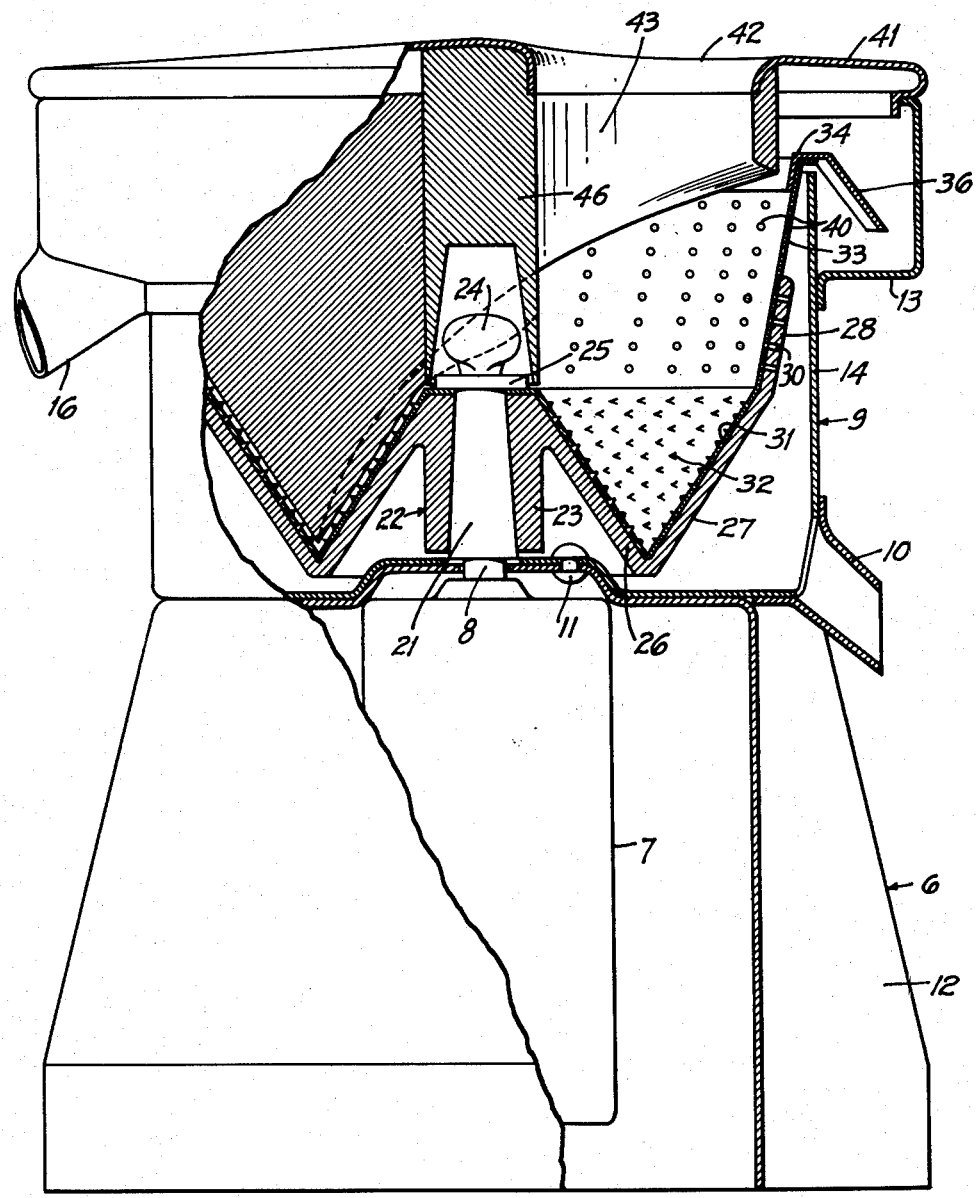

A removable cover 41 fits snugly upon the ring 13. The cover includes an entrance 42, generally circular in cross-section, through which fruit and vegetables to be converted into juice are fed into the feeder throat of an opening or passage 43 in a feeder element 44. This element is supported on the cover and includes an arcuate portion 45 extending downwardly and inwardly, as appears in Figures 1–9, for about 180° or more in the direction of rotation of the basket from adjacent the opening 42 until finally the element is very closely adjacent to the cutting element. It should be obvious that a solid introduced through the entrance 42 and becoming engaged with the revolving basket will be forced around by the basket; as it is comminuted, it will continue to advance until, finally, as appears in the left-hand side of Figure 10, so little space is present between the basket and the feeding throat that the solid is entirely comminuted.

The cover includes a central portion 46 having a receptacle therein for the thumbscrew 24 and washer 25 and fitting closely to the basket to protect these parts from contact with the liberated juices.

In operation, motor 7 operates normally at a relatively high rate of speed revolving the basket and its cutting element rapidly. Upon a solid being introduced through the entrance 42 and between the cutting element and the basket, comminution quickly occurs. The juice passes out through the perforations in the side wall of the cutting element and the side wall of the basket to collect in the juice collecting portion of the casing and thence out through spout 10. Solids are separated from the juice and pass upwardly, finally being thrown outwardly over lip 34 and collecting in the annular trough wherein they are moved by fingers 36 forcing them to the region of spout 16 through which they emerge.

A solid-liquid separation is thus quickly effected and both the solids and the liquids are continuously removed from the juicer in separate streams. In this way, the device can be used continuously without the necessity for interrupting the juicing operation to remove collected solids. It is only when the device has been used to the desired extent that it is neecssary to take it apart and wash the various working parts to remove the fruit or vegetable juices. The working parts are relatively simple and rugged and are easily removed, cleaned and reassembled.

I claim:

1. In a fruit and vegetable juicer, an outer casing divided into a liquid collection portion and a solid collection portion, a basket, means for rotating the basket at high speed, said basket being a W in cross-section and being supported for rotation at the apex of the middle of the W, each V of the W being perforated along the outer leg thereof, a cutting element carried snugly by said basket and covering each V thereof, said element having a plurality of teeth thereon and being perforated along its outer wall to discharge liquid therethrough into said liquid collection portion, said element continuing upwardly and extending to said solid collection portion to discharge solids into said portion by centrifugal force and a cover for said basket, said cover having a feed opening therein and a feed element extending downwardly from adjacent said opening cooperatively to adjacent said basket and fitting the V of said W to force material fed in through said opening against said macerating means until said material is completely macerated.

2. In a fruit and vegetable juicer, an outer casing divided into a liquid collection portion and a solid collection portion, a basket, means for rotating the basket at high speed, said basket being a W in cross-section and being supported for rotation at the apex of the middle of the W, each V of the W being perforated along the outer leg thereof, a cutting element carried snugly by said basket and covering each V thereof, said element having a plurality of teeth thereon and being perforated along its outer wall to discharge liquid therethrough into said liquid collection portion, said element continuing upwardly and extending to said solid collection portion to discharge solids into said portion by centrifugal force, and a feeding element curved from an entrance downwardly in the direction of rotation of said basket and terminating closely adjacent to said cutting element to feed material in and against said element.

3. In a fruit and vegetable juicer, a vertically positioned shaft, means for rotating said shaft at high speed, a basket carried by said shaft for rotation, said basket being a W in cross-section and being supported on said shaft of the midpoint of the W, the inner legs of the W being imperforate and being provided with a plurality of material macerating means, said outer legs having macerating means and being imperforate only from the point of connection with the inner legs to a point about mid-way up the outer legs, the upper portion of the outer legs being perforated to pass juice therethrough and provide a discharge run for discharge of solids and a cover for said basket, said cover having a feed opening therein and a feed element extending downwardly from adjacent said opening cooperatively to adjacent said basket and fitting the V of said W to force material fed in through said opening against said macerating means until said material is completely macerated.

4. In a fruit and vegetable juicer, a vertically positioned shaft, means for rotating said shaft at high speed, a basket carried by said shaft for rotation, said basket being a W in cross-section and being supported on said shaft of the midpoint of the W, the inner legs of the W being imperforate and being provided with a plurality of material macerating means, said outer legs having macerating means and being imperforate only from the point of connection with the inner legs to a point about mid-way up the outer legs, the upper portion of the outer legs being perforated to pass juice therethrough and provide a discharge run for discharge of solids, and a feeding element curved from an entrance downwardly in the direction of rotation of said basket and terminating closely adjacent to the bottom of one of the V's making up said W to feed material in and against the macerating means.

5. In a fruit and vegetable juicer, an outer casing having a liquid collection portion and a solid collection portion, a basket comprising a central hub portion having an outwardly extending integral wall portion and an outer wall joined thereto to form an annular trough concentric with said central hub portion, a perforate wall extending from said outer wall of said trough and arranged to convey the solids to the solid collection portion, macerating means on the walls of said trough, means for rotating said basket, and a feeding element over said basket and having an opening therein for admission of fruits and vegetables, said element curving downwardly in the direction of rotation to a terminal portion close to and fitting said annular trough.

JOHN E. BENNETT.